United States Patent Office 3,668,006
Patented June 6, 1972

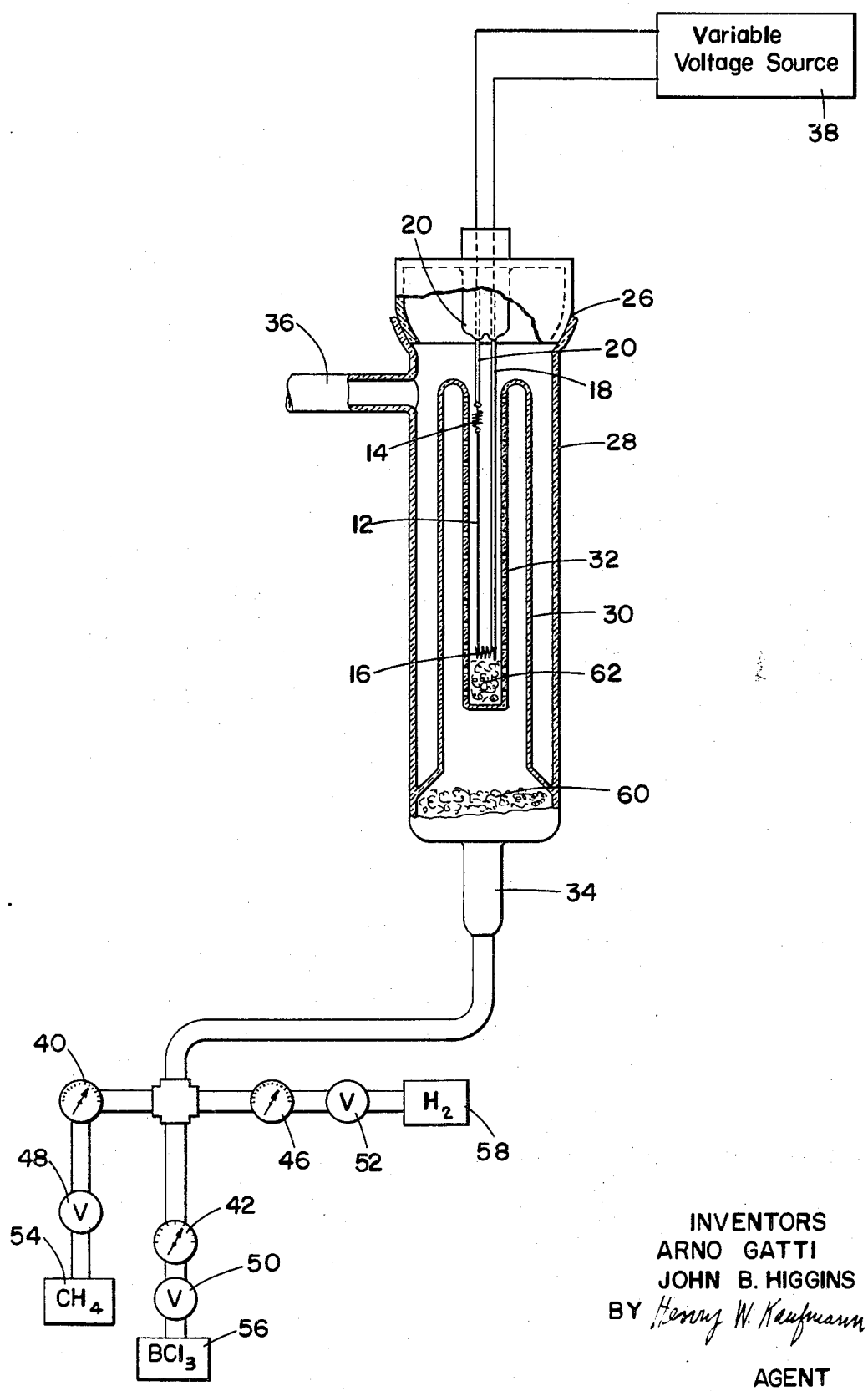

3,668,006
FORMATION OF HIGH-STRENGTH HIGH-MODULUS COATED FILAMENTS
John B. Higgins, Philadelphia, and Arno Gatti, Norristown, Pa., assignors to General Electric Company
Continuation of application Ser. No. 483,978, Aug. 31, 1965. This application June 2, 1969, Ser. No. 834,194
Int. Cl. C23c *13/04*
U.S. Cl. 117—231                                    1 Claim

ABSTRACT OF THE DISCLOSURE

A substrate of core filament, of relatively small diameter, is heated to at least 900° C. in the presence of hydrogen, methane and boron trichloride in preselected proportions to produce a strong, stiff, relatively large diameter filament which, apart from the core, comprises a 21-35% carbon, remainder boron, compound essentially free of faults, cracks, grain boundaries, etc. Preferably a tungsten substrate filament about 1 mil in diameter is heated to 900° C. and then 1200° C. in the presence of an atmosphere comprised, in mole fractions, of the following: 0.605-0.686 hydrogen, 0.076-0.185 methane, and 0.210-0.238 boron trichloride. After several minutes filamentary diameters on the order of 4-7 mils are attained with filament properties approaching those of amorphous boron carbide.

---

This application is a continuation of application Ser. No. 483,978, filed Aug. 31, 1965, now abandoned.

This invention pertains to the production on heated substrates of coatings of the general composition of boron carbide, having high tensile strength and elastic modulus.

It is known in the art of producing high-strength structural materials to utilize fibers or filaments of high tensile strength and, preferably, of high elastic modulus (which appears, colloquially, as "stiffness"), as reinforcements or fillers for a surrounding matrix such as an organic resin or a metal. The matrix thus reinforced has desirable properties of high strength and resultant high ratio of strength to density, and is suited to applications where these properties are essential, as in the prodution of space vehicles.

We have found a process for investing metal filaments (such, e.g. as tugnsten) with homogeneous boron carbide which produces a composite structure having tensile strength as high as 330,000 pounds per square inch, and an elastic modulus of 65,000,000 pounds per square inch.

This very high modulus (more than twice that of steel) is desirable to insure that stresses applied to a matrix will be transferred in large measure to the boron carbide reinforcement, so that use will be made of its high tensile strength.

The process we have found consists, briefly, in heating e.g. a metal filament (which may conveniently be done by passing an electric current through it) in the presence of a mixture of methane, boron trichloride, and hydrogen. By varying the proportions of these it is possible to produce varying deposits, which may be stoichiometric boron carbide or may be rich in boron or in carbon.

Thus we achieve the general object of producing a fiber of high tensile strength and elastic modulus, by a process which may be simply controlled and may be made continuous and thus offers possibilities of economy.

For the better explanation of our invention we have provided a figure of a drawing which represents an arrangement of apparatus suitable for a batch production of the composite fibers.

The figure represents a filament 12 (which may conveniently be of tungsten 0.001 inch in diameter) stretched between springs 14 and 16 (which may be of stainless steel) which in turn are supported by wires 18 and 20 which are sealed through a stem 24 which is joined by a conventional ground joint 26 to the body 28 of the apparatus, all the nonmetallic portions of the apparatus being of glass. Body 28 has sealed inside it from its lower end a support tube 30 which has a perforated reentrant portion 32 which serves as a gas distribution tube. At the bottom of body 28 a gas inlet tube 34 is sealed, and near its upper end a gas outlet tube 36 is similarly sealed. The external parts of wires 18 and 20 are connected to a variable voltage source 38. Gas inlet 34 is connected to flow meters 40, 42, and 46 and valves 48, 50, and 52 which are connected, respectively, to methane source 54, boron trichloride source 56, and hydrogen source 58.

None of the apparatus dimensions is critical. In the apparatus used by the applicants, the length of the tungsten filament was about 5 inches. The dimensions inside the apparatus were about 2½ inches internal diameter of the body 28; support tube 30 was about 10 inches long and 1¾ in diameter; and gas distribution tube 32 was about 1 inch in diameter and had approximately ⅛-inch holes in it, on ½-inch centers.

Tufts of glass wool were provided at 60 and 62. That at 60 helped to mix the incoming gases; that at 62 damped any movements of wire 18 and spring 16. Gas outlet 36 may discharge directly or through a vacuum system into a hood (since the effluent gases always contain HCl and may contain combustible components).

The basic equation of the reaction employed is:

$$4BCl_3 + CH_4 + 4H_2 = B_4C + 12HCl$$

but it is possible, by adjusting the proportions of the reactant gases, to produce a deposit which contains either boron or carbon in excess.

In operation of the apparatus of FIG. 1, filament 12 is placed between springs 14 and 16 so that they are under slight tension, in order that thermal expansion of the filament in subsequent heating will not leave it slack. By the use of a suitable bridle arrangement, up to 6 filaments have been run in parallel, but for convenience of description only a single filament will be considered. To render the surface uniform, the filament is first surrounded by hydrogen gas by opening valve 52 and flushing the system to displace all air with hydrogen. Then the power supply 38 is adjusted so that the filament 12 is raised to 1200 degrees C., which may be measured with an optical pyrometer; and the filament 12 is maintained at this temperature for two minutes. The voltage is then reduced to zero, and valves 48, 50, and 52 are adjusted to provide an atmosphere suitable for boron carbide deposition. Supply 38 is then adjusted to bring the temperature of filament 12 to 900 degrees C., at which temperature it is left for two or three minutes. This preliminary treatment has been found desirable to prevent the formation of localized hot spots during the main deposition operation, which may now be conducted simply by raising the filament 12 temperature to 1200 degrees C. A variety of gas compositions and pressures may be employed; the gas distribution tube 32 tends to assure that the same composition and temperature of mixture is provided everywhere along the filament 12. When no distribution tube is used there is a tendency for the upper end of filament 12 to receive largely gases which have been heated by the lower parts of the filament; hence the upper end overheats.

The table gives some of the conditions which have been used successfully to produce nominally boron carbide filaments. In all cases, the pressure was one atmosphere, and the temperature of the substrate filament was maintained at 900 degrees centigrade for three minutes and then raised to 1200 degrees centigrade for another three minutes. Product diameters are given in inch-mils, or thousandths of an inch, and tensile strength and Young's modulus in kilopounds per squire inch, or kips. Product characteristics are average for a large number of samples, except for the data on a single sample marked "Best value." Analyses of samples produced with various concentrations of methane show that for molar concentrations of methane from 4 to 19 percent in the gas mixture used, the weight percentage carbon in the nominal boron carbide is expressed by the relation:

Percentage carbon in deposit = 14.5 + 1.07 (Mole percent methane in gas)

TABLE

| Test | Gas: Composition, mol fraction | | | Flow, ml./min. | Product | | Young's modulus, kips |
|---|---|---|---|---|---|---|---|
| | $H_2$ | $CH_4$ | $BCl_3$ | | Diam., in.-mils | T.S., kips | |
| 173W | .670 | .098 | .233 | 1,805 | 6.0 | 136 | 64,300 |
| 174W | .670 | .097 | .233 | 1,805 | 6.4 | 205 | 64,400 |
| 176W | .686 | .076 | .238 | 1,765 | 5.3 | 192 | 65,400 |
| 177W | .686 | .076 | .238 | 1,765 | 6.3 | 107 | 66,000 |
| 178W | .610 | .124 | .226 | 1,860 | 5.9 | 187 | 63,200 |
| 179W | .610 | .124 | .226 | 1,860 | 5.2 | 240 | 62,600 |
| 179W | .610 | .124 | .226 | 1,860 | 4.0 | 331 | (¹) |
| 180W | .627 | .155 | .218 | 1,930 | 6.8 | 128 | 48,900 |
| 181W | .627 | .155 | .218 | 1,930 | 5.8 | 167 | 54,900 |
| 182W | .605 | .185 | .210 | 2,000 | 7.1 | 103 | 41,000 |
| 183W | .605 | .185 | .210 | 2,000 | 6.6 | 78 | 46,400 |

¹ Best value

The percentage by weight of carbon corresponding to stoichiometric boron carbide is 21.7 percent. Tensile test data indicate that an excess of carbon above this produces the highest tensile strength, the range from about 25 percent to 30 percent carbon content producing maximum values in excess of 300 thousand pounds per square inch, with a broad maximum of about 330 thousand pounds per square inch occurring at about 27.5 percent carbon content. Even with carbon content as high as 35 percent by weight, tensile strengths still remain about 200 thousand pounds per square inch. The elastic modulus decreases markedly for carbon contents much in excess of 27.5 percent, so that, allowing for usual manufacturing tolerances, it would appear that a carbon content of slightly below 27.5 percent is a reasonable objective for production, so that normal excess beyond the target quantity will not move the total past 27.5.

It is, of course, clear that to produce high tensile strengths the coating must be homogeneous in that, quite regardless of any crystalline, microcrystalline, noncrystalline structure, the coating must be free from cracks or other weakening divisions. Similarly, to achieve characteristics predominantly those of boron carbide rather than the central core of metal, the cross section of boron carbide should be considerably greater than that of the central core, e.g. four times as great, or more; in such case the tensile strength of the composite will be at least 80 percent of the tensile strength of boron carbide alone.

Tungsten wire has been found most satisfactory as the original filament, because its mechanical properties, particularly its melting point, are very suitable. Molybdenum has been used, but its lower melting point (and consequently lower softening or weakening temperature range) requires greater care in avoiding local or otherwise accidental overheating. The choice of base material is not critical so far as the operativeness of the process is concerned. Convenience and other factors determining economy may, of course, in a given situation favor one material rather strongly over others. While the present invention has been described as a batch process, it is evident that, since it deals with treatment of a continuous filament or wire, it may readily be adapted to a continuous process in which each distinct treatment is accomplished in a separate chamber through which the wire is fed continuously.

The appended claims are written in subparagraph form for ease in reading, and not by way of indicating any necessary relative importance or preferred relationship among the elements therein recited.

We claim:

1. A method for the deposition of boron-carbon compound having a carbon content by weight between 21 and 35 percent, the remainder being boron, upon an electrically conductive substrate of material comprising the steps of:
   (a) Surrounding the substrate with an atmosphere comprising hydrogen, methane, and boron trichloride in the following molar proportions relative to unity, the total concentration of the three said gases being unity and total pressure one atmosphere:

Hydrogen $H_2$ ........................ .065 to .686
   Methane $CH_4$ ........................ .076 to .185
   Boron Trichloride $BCl_3$ ............ .210 to .238

(b) Heating the substrate to a temperature between 900 and 1200 degrees centigrade while maintaining it in the said atmosphere;
   (c) Cooling the substrate to ambient room temperature while maintaining it in the said atmosphere.

References Cited
UNITED STATES PATENTS

| | | | |
|---|---|---|---|
| 3,369,920 | 2/1968 | Bourdeau et al. | 117—106 X |
| 3,367,826 | 2/1968 | Heestand et al. | 117—106 X |
| 2,810,664 | 10/1957 | Gentner. | |
| 2,810,365 | 10/1957 | Keser. | |
| 2,764,510 | 9/1956 | Zeigler. | |
| 2,671,735 | 3/1954 | Grisdale. | |
| 2,516,841 | 8/1950 | Arditi et al. | |

ALFRED L. LEAVITT, Primary Examiner

U.S. Cl. X.R.

117—46 CG, 106 C, DIG. 10